United States Patent
Ben Henda et al.

(10) Patent No.: US 11,974,122 B2
(45) Date of Patent: Apr. 30, 2024

(54) PROTECTION OF NON-ACCESS STRATUM COMMUNICATION IN A WIRELESS COMMUNICATION NETWORK

(71) Applicant: Telefonaktiebolaget LM Ericsson (publ), Stockholm (SE)

(72) Inventors: Noamen Ben Henda, Vällingby (SE); Monica Wifvesson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 469 days.

(21) Appl. No.: 17/267,825

(22) PCT Filed: Aug. 12, 2019

(86) PCT No.: PCT/EP2019/071570
§ 371 (c)(1),
(2) Date: Feb. 11, 2021

(87) PCT Pub. No.: WO2020/035441
PCT Pub. Date: Feb. 20, 2020

(65) Prior Publication Data
US 2021/0168601 A1 Jun. 3, 2021

Related U.S. Application Data

(60) Provisional application No. 62/718,208, filed on Aug. 13, 2018.

(51) Int. Cl.
*H04W 12/041* (2021.01)
*H04W 8/08* (2009.01)
(Continued)

(52) U.S. Cl.
CPC .......... *H04W 12/041* (2021.01); *H04W 8/08* (2013.01); *H04W 12/037* (2021.01); *H04W 12/06* (2013.01); *H04W 36/0038* (2013.01)

(58) Field of Classification Search
None
See application file for complete search history.

(56) References Cited

U.S. PATENT DOCUMENTS

| 11,071,021 B2* | 7/2021 | Lee .................. H04W 36/0072 |
| 2012/0140731 A1* | 6/2012 | Drapkin .............. H04W 12/041 370/331 |

(Continued)

FOREIGN PATENT DOCUMENTS

| CN | 105103578 A | 11/2015 |
| JP | 2011501479 A | 1/2011 |

(Continued)

OTHER PUBLICATIONS

3GPP, "3GPP 24.501 V15.0.0", 3rd Generation Partnership Project; Technical Specification Group Core Network and Terminals; Non-Access-Stratum (NAS) protocol for 5G System (5GS); Stage 3 (Release 15), Jun. 2018, 1-338.

(Continued)

*Primary Examiner* — Richard A McCoy
(74) *Attorney, Agent, or Firm* — Murphy, Bilak & Homiller, PLLC

(57) ABSTRACT

Network equipment (16A) is configured for use in a wireless communication network. The network equipment (16A) is configured to detect one or more conditions under which non-access stratum (NAS) keys (26A) that protect NAS communication between the network equipment (16A) and a wireless device (12) are to be refreshed. Responsive to detecting the one or more conditions, the network equipment (16A) is configured to derive, from a base key (24A) on which the NAS keys (26A) were derived, a new base key (24B) on which fresh NAS keys (26B) are to be derived. The network equipment (16A) is also configured to activate the new base key (24B).

13 Claims, 7 Drawing Sheets

(51) Int. Cl.
*H04W 12/037* (2021.01)
*H04W 12/06* (2021.01)
*H04W 36/00* (2009.01)

(56) References Cited

U.S. PATENT DOCUMENTS

| | | | |
|---|---|---|---|
| 2013/0028421 | A1 | 1/2013 | Feng et al. |
| 2016/0127896 | A1 | 5/2016 | Lee et al. |
| 2017/0150363 | A1 | 5/2017 | Tenny et al. |
| 2019/0320482 | A1 | 10/2019 | Hu et al. |
| 2020/0213858 | A1* | 7/2020 | Yi .......................... H04W 8/26 |

FOREIGN PATENT DOCUMENTS

| | | |
|---|---|---|
| JP | 2012533911 A | 12/2012 |
| JP | 2017513351 A | 5/2017 |
| KR | 20110040831 A | 4/2011 |
| WO | 2009150493 A1 | 12/2009 |
| WO | 2011018931 A2 | 2/2011 |
| WO | 2018120352 A1 | 7/2018 |
| WO | 2018138347 A1 | 8/2018 |

OTHER PUBLICATIONS

3GPP, "3GPP TS 33.220 V15.2.0", 3rd Generation Partnership Project; Technical Specification Group Services and System Aspects; Generic Authentication Architecture (GAA); Generic Bootstrapping Architecture (GBA) (Release 15), Jun. 2018, 1-93.

Ericsson, "NAS key refresh", 3GPP TSG SA WG3 (Security) Meeting #92 ad-hoc, S3-183224, Harbin (China), Sep. 24-28, 2018, 1-2.

Nec, et al., "Removal of UE and MME behaviour on NAS COUNT close to wrap around detection", 3GPP TSG-CT WG1 Meeting #60, C1-093281, (revision of C1-092285), Sevilla, Spain, Aug. 24-28, 2009, 1-3.

Qualcomm Incorporated, et al., "Clarifications to: Security handling in mobility", 3GPP TSG-SA WG3 Meeting #91Bis, S3-182092, (revision of S3-181511, merge of S3-182062 and S3-182004 and S3-181781 and S3-181682), La Jolla (US), May 21-25, 2018, 1-11.

3GPP, "3rd Generation Partnership Project; Technical Specification Group Services and System Aspects; 3GPP System Architecture Evolution (SAE); Security architecture (Release 15)", 3GPP TS 33.401 V15.4.0, Jun. 2018, 1-162.

3GPP, "3rd Generation Partnership Project; Technical Specification Group Services and System Aspects; Security architecture and procedures for 5G system (Release 15)", 3GPP TS 33.501 V15.1.0, Jun. 2018, 1-152.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, 1-217.

Ericsson, "Clause 8.3.1.4.1 (key change on fly, general)", 3GPP TSG SA WG3 (Security) Meeting #88Bis, S3-172332, (revision of S3-17xabc), Singapore, Oct. 9-13, 2017, 1-2.

Ericsson, et al., "IW HO from 5G to 4G", 3GPP TSG SA WG3 (Security) Meeting #90bis, S3-180959 (merger of S3-180708 and S3-180633 and S3-180785), San Diego, US, Feb. 26-Mar. 2, 2018, 1-4.

Ericsson, "Mobility—Correcting AS re-keying and NAS re-keying in N2-handover", 3GPP, TSG-SA WG3 Meeting #92, S3-182364, Dalian (China), Aug. 20-24, 2018, 1-5.

* cited by examiner

PROTECTION OF NON-ACCESS STRATUM COMMUNICATION IN A WIRELESS COMMUNICATION NETWORK

TECHNICAL FIELD

The present application relates generally to a wireless communication network, and relates more particularly to protection of non-access stratum (NAS) communication in such a network.

BACKGROUND

The non-access stratum (NAS) is the highest stratum of the control plane between a wireless device and a core network of a wireless communication system. The NAS supports for instance mobility management and session management for a wireless device.

Protecting NAS communication between the wireless device and the core network involves integrity protection and/or ciphering of the communication. The wireless device and the core network must agree on the NAS keys to be used for this protection. But the NAS keys should be refreshed or otherwise changed occasionally, in order to prevent unauthorized key re-use. Keeping the wireless device and the core network in agreement on the NAS keys, even when the NAS keys are to be changed, proves challenging to do in a way that robustly accounts for future generations of wireless communication networks and that keeps signalling overhead low.

SUMMARY

Some embodiments herein exploit horizontal key derivation to refresh non-access stratum (NAS) keys that protect NAS communication in a wireless communication network. With the currently active NAS keys having been derived from a currently active base key (e.g., currently active $K_{AMF}$), horizontal key derivation may involve deriving a new base key (e.g., new $K_{AMF}$) from the currently active base key and then deriving fresh NAS keys from the new base key. NAS keys may be refreshed in this way for instance in anticipation of a NAS count for a NAS connection between a wireless device and network equipment wrapping around from a maximum value to an initial value. This may in turn protect the transfer of the wireless device's security context between different wireless communication networks, even networks of different generations (e.g., a transfer between 5G and 6G networks). Moreover, the horizontal key derivation proves more efficient in terms of control signalling than having to run primary authentication procedures or active native security contexts in order to refresh the NAS keys.

More particularly, embodiments herein include a method performed by network equipment configured for use in a wireless communication network. The method comprises detecting one or more conditions under which non-access stratum (NAS) keys that protect NAS communication between the network equipment and a wireless device are to be refreshed. The method may also comprise, responsive to detecting the one or more conditions, deriving, from a base key on which the NAS keys were derived, a new base key on which fresh NAS keys are to be derived. The method in some embodiments may also include activating the new base key.

In some embodiments, the one or more conditions include a value of a NAS count for a NAS connection between the network equipment and the wireless device being within a certain threshold from a maximum value of the NAS count. In this case, the NAS count counts a number of NAS messages sent in a certain direction over the NAS connection.

Alternatively or additionally, the one or more conditions include one or more conditions that are detected before a value of a NAS count for a NAS connection between the network equipment and the wireless device wraps around from a maximum value to an initial value. The NAS count counts a number of NAS messages sent in a certain direction over the NAS connection.

In still other embodiments, the one or more conditions alternatively or additionally include the NAS keys having been used for at least a threshold length of time or a threshold number of times.

In some embodiments, deriving the new base key comprises deriving the new base key from the base key and a value of a NAS count that counts a number of NAS messages sent in a certain direction over a NAS connection between the network equipment and the wireless device.

In some embodiments, deriving the new base key comprises computing the new base key as an output of a key derivation function that takes a string and a key as inputs. In this case, the base key is input to the key derivation function as the key, and a set of parameters concatenated together is input to the key derivation function as the string. The set of parameters includes a value of a NAS count that counts a number of NAS messages sent in a certain direction over a NAS connection between the network equipment and the wireless device. In one embodiment, for instance, the key derivation function is a hash-based message authentication code (HMAC) function that uses a Secure Hash Algorithm (SHA) to hash inputs to the HMAC function in the form of a string and a key.

In some embodiments, activating the new base key comprises performing a NAS security mode command (SMC) procedure between the network equipment and the wireless device to establish between the network equipment and the wireless device a new NAS security context that includes the new base key. In one embodiment, for instance, performing the NAS SMC procedure comprises transmitting a NAS SMC message to the wireless device indicating a value of a NAS count that counts a number of NAS messages sent in a certain direction over a NAS connection between the network equipment and the wireless device.

In some embodiments, the new base key is included in a new security context established between the network equipment and the wireless device. In this case, the method further may comprise transferring the new security context to other network equipment.

In some embodiments, the method further comprises transmitting or receiving NAS communication that is protected with the fresh NAS keys.

In some embodiments, the NAS count described above is an uplink NAS count that counts a number of NAS messages sent in an uplink direction over the NAS connection or the NAS count is a downlink NAS count that counts a number of NAS messages sent in a downlink direction over the NAS connection.

In any of the above embodiments, the network equipment may implement an access and mobility function (AMF). In this case, the base key is a key $K_{AMF}$, and wherein the new base key is a new key $K_{AMF}$.

In some embodiments, deriving the new base key may comprise deriving the new base key without running a primary authentication procedure or activating a native security context.

In some embodiments, the method further comprises incrementing a value of a NAS count for a NAS connection between the network equipment and the wireless device before transferring a NAS security context for the wireless device to other network equipment. In this case, the above described detecting, deriving, and activating is performed after said incrementing but before said transferring.

Embodiments herein also include corresponding apparatus, computer programs, and carriers. For example, embodiments include network equipment configured for use in a wireless communication network. The network equipment is configured (e.g., via communication circuitry and processing circuitry) to detect one or more conditions under which non-access stratum (NAS) keys that protect NAS communication between the network equipment and a wireless device are to be refreshed; responsive to detecting the one or more conditions, derive from a base key on which the NAS keys were derived a new base key on which fresh NAS keys are to be derived; and activate the new base key.

Embodiments herein also includes a method performed by network equipment configured to implement an access and mobility function (AMF). The method may include activating fresh non-access stratum (NAS) keys from horizontal $K_{AMF}$ derivation before a NAS uplink or downlink COUNT wraps around with a current security context. Here, the horizontal $K_{AMF}$ derivation derives a new $K_{AMF}$ key from a currently active $K_{AMF}$ key.

Embodiments further include network equipment configured to implement an access and mobility function (AMF). The network equipment is configured (e.g., via communication circuitry and processing circuitry) to activate fresh non-access stratum (NAS) keys from horizontal $K_{AMF}$ derivation before a NAS uplink or downlink COUNT wraps around with a current security context. The horizontal $K_{AMF}$ derivation derives a new $K_{AMF}$ key from a currently active $K_{AMF}$ key.

DETAILED DESCRIPTION

Figure 1:
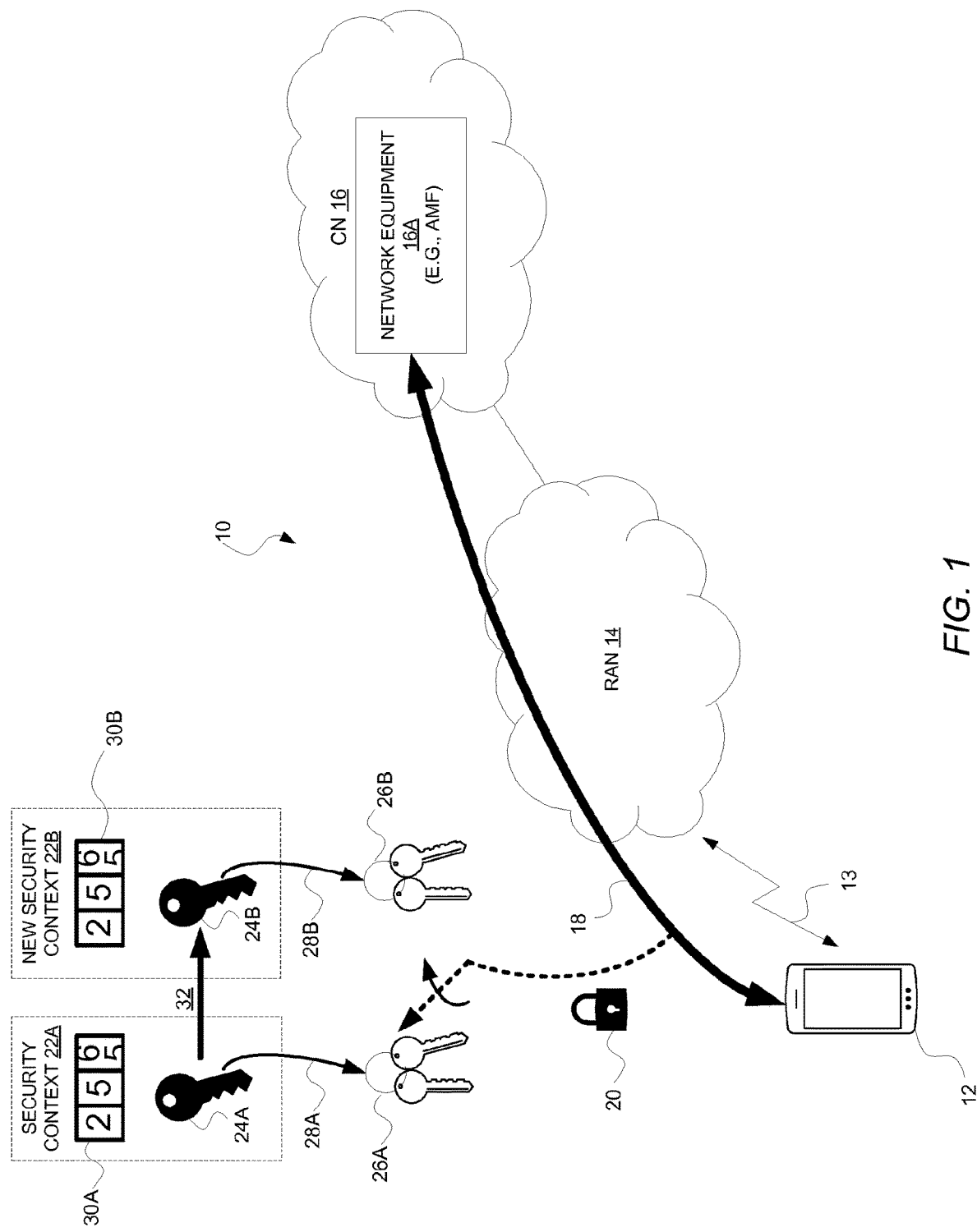
FIG. 1 is a block diagram of a wireless communication system 10 according to some embodiments.

FIG. 1 shows a wireless communication system 10 according to some embodiments. According to FIG. 1, a wireless device 12 (e.g., a user equipment) communicates with a radio access network (RAN) 14 over a radio interface 13 in order to access a core network (CN) 16 of the system 10. The CN 16 may in turn connect the wireless device 12 to one or more data networks such as the Internet.

The CN 16 includes network equipment 16A in a control plane of the CN 16. In the control plane, the network equipment 16A engages in non-access stratum (NAS) communication 18 with the wireless device 12, e.g., as part of supporting mobility management of the wireless device 12. In these and other embodiments, the NAS communication 18 may be used for broadcast of system information, paging, transfer of NAS information, access stratum (AS) security configuration, transfer of radio access capability, measurement configuration and reporting, and/or mobility control. Such NAS communication 18 may be performed as NAS messages transferred over a NAS connection between the wireless device 12 and the network equipment 16A. In embodiments where the CN 16 is a 5G core network, the network equipment 16A may implement an access and mobility function (AMF).

Regardless, the wireless device 12 and the network equipment 16A apply protection 20 to the NAS communication 18, e.g., in the form of integrity protection and/or ciphering. FIG. 1 in this regard shows that the wireless device 12 and the network equipment 16A maintain a security context 22A (e.g., a 5G NAS security context) for the wireless device 12. The security context 22A includes, among other things, a base key 24A. The base key 24A may for instance be a key $K_{AMF}$ derived from an anchor key $K_{SEAF}$ in embodiments where the network equipment 16A implements an AMF. No matter the particular nature of the base key 24A, though, the wireless device 12 and the network equipment 16A derive NAS keys 26A from the base key 24A, e.g., via vertical key derivation 28A. The wireless device 12 and the network equipment 16A base protection 20 of the NAS communication 18 on these NAS keys 26A. The NAS keys 26A may for instance include one NAS key $K_{NASint}$ for integrity protection and one NAS key $K_{NASenc}$ for ciphering/encryption.

The network equipment 16A according to some embodiments may detect one or more conditions under which the NAS keys 26A are to be refreshed. Consider for instance embodiments where the security context 22A includes a NAS count 30A for a NAS connection between the wireless device 12 and the network equipment 16A. The NAS count 30A counts a number of NAS messages sent in a certain direction (e.g., uplink or downlink) over a NAS connection. In this case, the one or more conditions in some embodiments include a value of the NAS count 30A being "close to" wrapping around from a maximum value to an initial value. The one or more conditions may be defined for instance as a value of the NAS count 30A being within a certain threshold (X) from the maximum value. Alternatively or additionally, the one or more conditions may include one or more conditions that are detected before the value of the NAS count 30A wraps around. In still other embodiments, the one or more conditions may include the NAS keys 26A having been used for at least a threshold length of time or a threshold number of times.

No matter the particular condition(s) that trigger refresh of the NAS keys 26A, the network equipment 16A in response to detecting the condition(s) derives a new base key 24B from the base key 24A on which the NAS keys 26A were derived. This new base key 24B as shown in FIG. 1 may be included in a new security context 22B for the wireless device 12. Regardless, the network equipment 16A may derive the new base key 24B from the (old) base key 24A via horizontal key derivation 32. Notably, then, the network equipment 16A (horizontally) derives the new base key 24B from the (old) base key 24A, without running a primary authentication procedure or activating a native security context. This key derivation proves advantageous from a control signaling overhead perspective, as horizontal key derivation requires less control signaling than e.g., primary authentication.

More particularly, derivation of the new base key 24B may involve deriving the new base key 24B from the (old) base key 24A and a value of the NAS count 30A (e.g., a value of the uplink NAS count). As one example, the new base key 24B may be computed as the output of a key derivation function (KDF) that takes a string and a key as inputs. The (old) base key 24A may be input to the KDF as the input key. A set of parameters may be concatenated together and input to the KDF as the input string. The set of parameters may include a value of the NAS count 30A.

Consider an example where the (old) base key 24A is a key $K_{AMF}$, the new base key 24B is a key $K_{AMF}'$, and the KDF is a hash-based message authentication code (H MAC) function that uses a Secure Hash Algorithm (SHA) to hash inputs to the HMAC function in the form of a string and a key. In this case, the new base key $K_{AMF}'$ may computed as $K_{AMF}'$=HMAC-SHA-256(Key, S), where Key=$K_{AMF}$ and S is the input string constructed from a set of parameters that includes the value of the NAS count 30A.

No matter the particular way that the network equipment 16A derives the new base key 24B from the (old) base key 24A, fresh NAS keys 26B are to be derived from this new base key 24B, e.g., via vertical key derivation 28B. And the wireless device 12 and the network equipment 16A are to switch to basing the protection 20 of the NAS communication 18 on these fresh NAS keys 26B.

The network equipment 16A in this regard is further configured to activate the new base key 24B, e.g., in order that the new base key 24B (and fresh NAS keys 26B) are taken into use for protection. As shown in FIG. 1, for example, the new base key 24B may be included in a new security context 22B. The network equipment 16A may activate the new base key 24B by establishing between the network equipment 16A and the wireless device 12 the new security context 22B that includes the new base key 24B. The network equipment 16A may establish the new security context 22B by performing a NAS security mode command (SMC) procedure between the network equipment 16A and the wireless device 12. This NAS SMC procedure may involve the network equipment 16A transmitting a NAS SMC message to the wireless device 12 indicating the value of the NAS count 30A, e.g., on which to base a NAS count 30B for the new security context 22B.

Note in this regard though that, in some embodiments, the network equipment 16A performs the above-described processing in conjunction with and/or in anticipation of transferring a security context for the wireless device 12 to other network equipment (e.g., as part of an AMF change resulting from idle mode mobility or connected mode handover). In these and other embodiments, before transferring a security context for the wireless device 12, the network equipment 16A may increment the value of a NAS count for a NAS connection between the network equipment 16A and the wireless device 12, e.g., to protect the security context transfer and/or to ensure backward security. In this case, the network equipment 16A may detect the one or more conditions for horizontal derivation of the new base key 24B after, as part of, or in anticipation of incrementing the NAS count 30A. After incrementing the NAS count 30A, therefore, the network equipment 16A may perform horizontal key derivation to derive the new base key 24B, activate the new base key 24B, and then transfer the new security context 22B for the wireless device 12. Notably, some embodiments protect this transfer of the new security context 22B between different wireless communication networks, even networks of different generations (e.g., a transfer between 5G and 6G networks).

Figure 2:
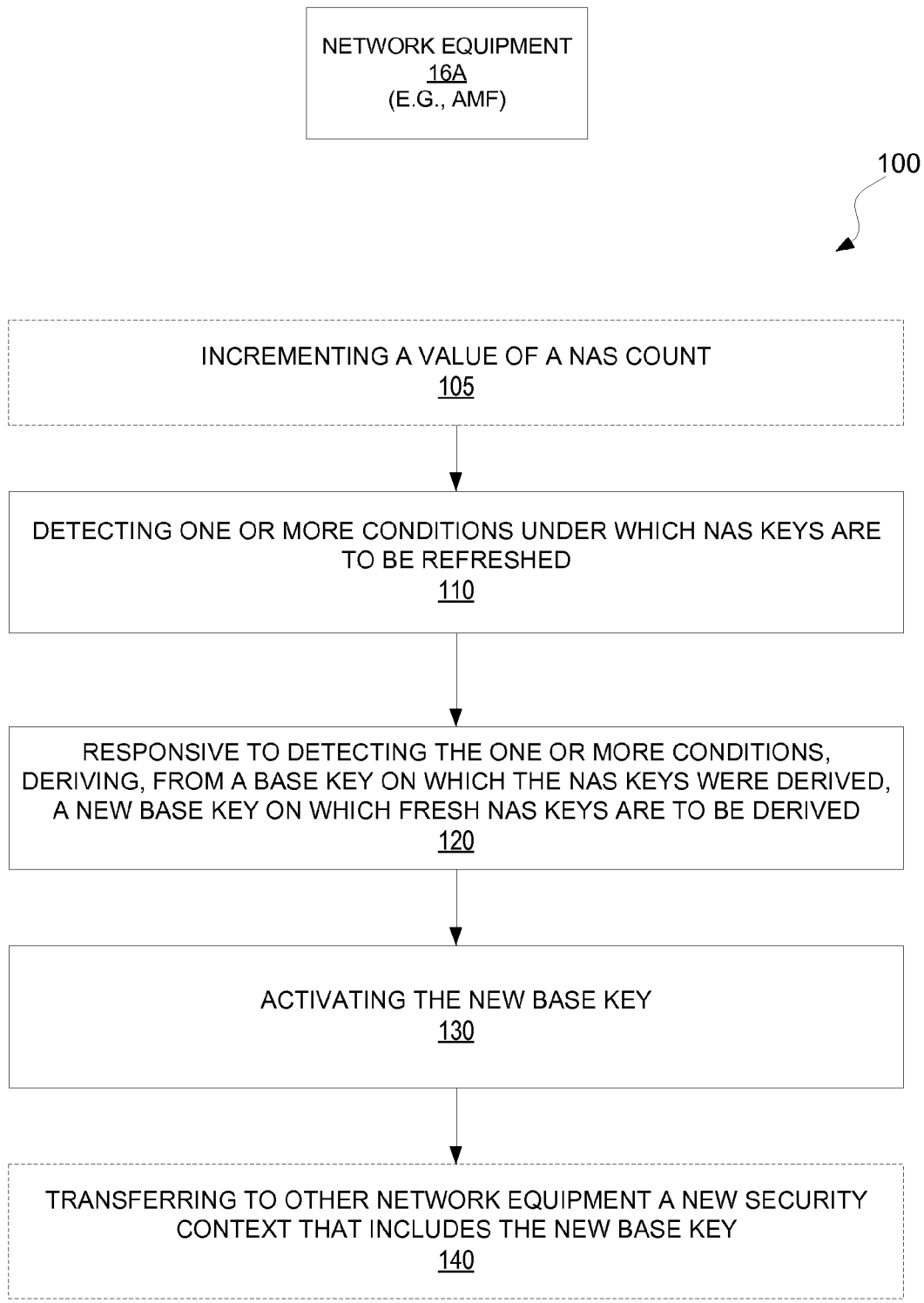
FIG. 2 is a logic flow diagram of a method performed by network equipment according to some embodiments.

In view of the above described variations and modification, FIG. 2 depicts a method performed by network equipment 16A (e.g., configured to implement an AMF) configured for use in a wireless communication network in accordance with particular embodiments. The method includes detecting one or more conditions under which NAS keys 26A (that protect NAS communication 18 between the network equipment 16A and the wireless device 12) are to be refreshed (Block 110). The condition(s) may include for instance a value of a NAS count 30A for a NAS connection between the network equipment 16A and the wireless device 12 being within a certain threshold from a maximum value of the NAS count 30A. Regardless, the method also includes, responsive to detecting the one or more conditions, deriving, from a base key 24A on which the NAS keys 26A were derived, a new base key 24B on which fresh NAS keys 26B are to be derived (Block 120). The method as shown may also include activating the new base key 24B (Block 130).

In some embodiments, the method may also include transferring to other network equipment (e.g., configured to implement a new AMF) a new security context 22B that includes the new base key 24B (Block 140). In fact, in some embodiments, the method may be performed in anticipation of such a transfer. For example, in some embodiments, the security context transfer prompts incrementing of the NAS count 30A, e.g., to protect the transfer and/or provide backwards security. In such a case, then, the method as shown may further include incrementing the NAS count 30A (Block 105).

Regardless, in some embodiments, the one or more conditions include a value of a NAS count 30A for a NAS connection between the network equipment 16A and the wireless device 12 being within a certain threshold from a maximum value of the NAS count 30A, where the NAS count 30A counts a number of NAS messages sent in a certain direction over the NAS connection.

Alternatively or additionally, the one or more conditions may include one or more conditions that are detected before a value of a NAS count 30A for a NAS connection between the network equipment 16A and the wireless device 12 wraps around from a maximum value to an initial value, where the NAS count 30A counts a number of NAS messages sent in a certain direction over the NAS connection.

In some embodiments, the one or more conditions include the NAS keys 26A having been used for at least a threshold length of time or a threshold number of times.

In some embodiments, deriving the new base key 24B comprises deriving the new base key 24B from the base key 24A and a value of a NAS count 30A that counts a number of NAS messages sent in a certain direction over a NAS connection between the network equipment 16A and the wireless device 12.

In some embodiments, deriving the new base key 24B comprises computing the new base key 24B as an output of a key derivation function that takes a string and a key as inputs. In this case, the base key 24A is input to the key derivation function as the key. A set of parameters concatenated together is input to the key derivation function as the string. And the set of parameters includes a value of a NAS count 30A that counts a number of NAS messages sent in a certain direction over a NAS connection between the network equipment 16A and the wireless device 12. In one such embodiment, for example, the key derivation function is a hash-based message authentication code (HMAC) function that uses a Secure Hash Algorithm (SHA) to hash inputs to the HMAC function in the form of a string and a key.

In some embodiments, activating the new base key 24B comprises performing a NAS security mode command (SMC) procedure between the network equipment 16A and the wireless device 12 to establish between the network equipment 16A and the wireless device 12 a new NAS security context that includes the new base key 24B. In one embodiment, for example, performing the NAS SMC procedure comprises transmitting a NAS SMC message to the wireless device 12 indicating a value of a NAS count 30A that counts a number of NAS messages sent in a certain direction over a NAS connection between the network equipment 16A and the wireless device 12.

In some embodiments, the method may further comprise transmitting or receiving NAS communication that is protected with the fresh NAS keys 26B.

In some embodiments, the NAS count 30A is an uplink NAS count that counts a number of NAS messages sent in an uplink direction over the NAS connection or the NAS count 30A is a downlink NAS count that counts a number of NAS messages sent in a downlink direction over the NAS connection.

In some embodiments, the network equipment 16A implement an access and mobility function (AMF). In this case, the base key 24A is a key $K_{AMF}$ and the new base key 24B is a new key $K_{AMF}$.

In some embodiments, deriving the new base key 24B comprises deriving the new base key 24B without running a primary authentication procedure or activating a native security context.

In some embodiments, the method further comprises incrementing a value of a NAS count 30A for a NAS connection between the network equipment 16A and the wireless device 12 before transferring a NAS security context for the wireless device 12 to other network equipment. In this case, the detecting, deriving, and activating is performed after the incrementing but before the transferring.

Figure 3:
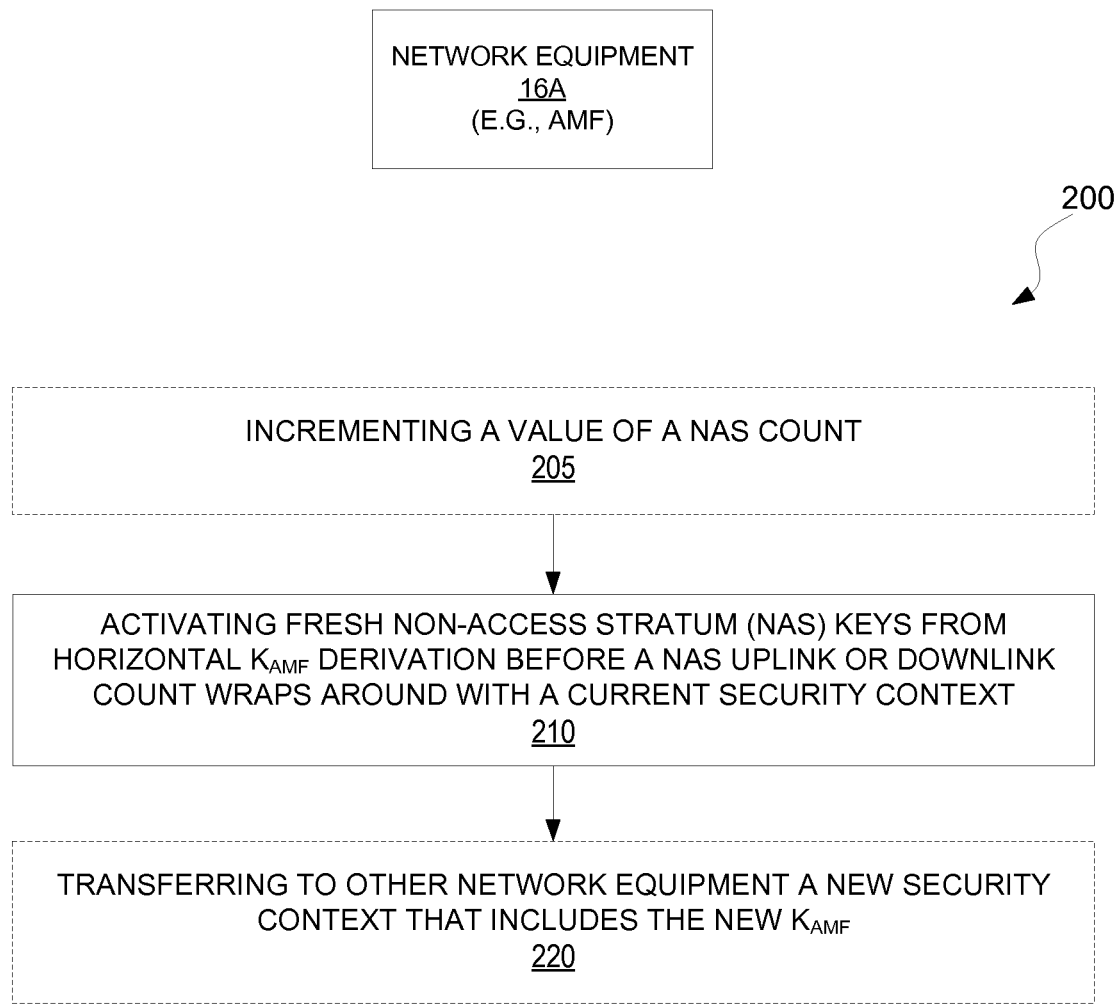
FIG. 3 is a logic flow diagram of a method performed by network equipment according to other embodiments.

Alternatively or additionally, FIG. 3 depicts a method performed by network equipment 16A configured to implement an access and mobility function (AMF) in accordance with other particular embodiments. The method includes activating fresh NAS keys 26B from horizontal $K_{AMF}$ derivation before a NAS uplink or downlink COUNT 30A wraps around with a current security context 22A (Block 210). Similarly as above, in some embodiments, the method may also include transferring to other network equipment (e.g., implementing a new AMF) a new security context 22B that includes the horizontally derived $K_{AMF}$ (Block 220). In fact, in some embodiments, the method may be performed in anticipation of such a transfer. For example, in some embodiments, the security context transfer prompts incrementing of the NAS uplink or downlink COUNT, e.g., to protect the transfer and/or provide backwards security. In such a case, then, the method as shown may further include incrementing the uplink or downlink NAS COUNT (Block 205).

Note that the network equipment 16A described above may perform the methods herein and any other processing by implementing any functional means, modules, units, or circuitry. In one embodiment, for example, the network equipment 16A comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4A:
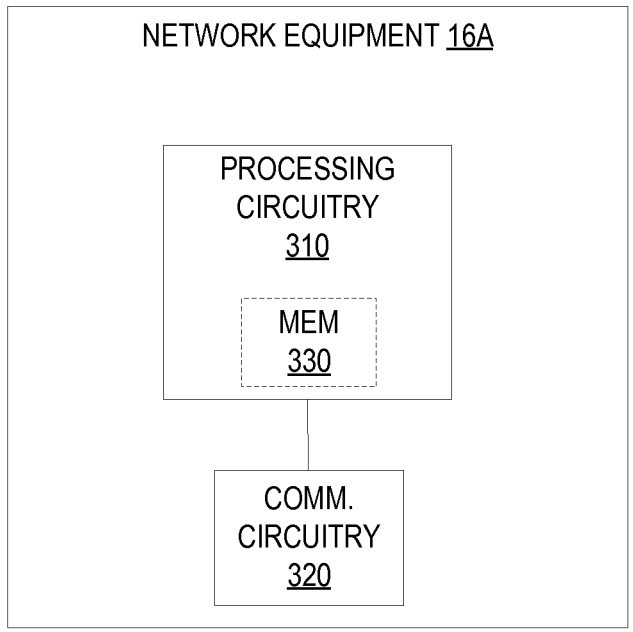
FIG. 4A is a block diagram of network equipment according to some embodiments.

FIG. 4A for example illustrates network equipment 16A as implemented in accordance with one or more embodiments. As shown, the network equipment 16A includes processing circuitry 310 and communication circuitry 320. The communication circuitry 320 is configured to transmit and/or receive information to and/or from one or more other nodes or equipment, e.g., via any communication technology. The processing circuitry 310 is configured to perform processing described above (e.g., in FIGS. 2 and/or 3), such as by executing instructions stored in memory 330. The processing circuitry 310 in this regard may implement certain functional means, units, or modules.

Figure 4B:
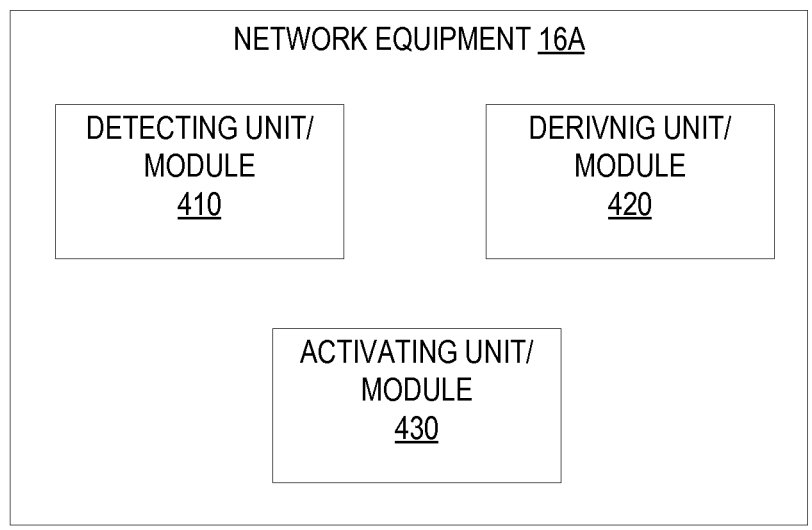
FIG. 4B is a block diagram of network equipment according to other embodiments.

FIG. 4B illustrates a schematic block diagram of network equipment 16A according to still other embodiments. As shown, the network equipment 16A implements various functional means, units, or modules, e.g., via the processing circuitry 310 in FIG. 4A and/or via software code. These functional means, units, or modules, e.g., for implementing the method in FIG. 2, includes a detecting unit or module 410 for detecting one or more conditions under which NAS keys 26A (that protect NAS communication 18 between the network equipment 16A and the wireless device 12) are to be refreshed. Also included may be a deriving unit or module 420 for, responsive to detecting the one or more conditions, deriving, from a base key 24A on which the NAS keys 26A were derived, a new base key 24B on which fresh NAS keys 26B are to be derived. Further included may be an activating unit or module 430 for activating the new base key 24B.

Those skilled in the art will also appreciate that embodiments herein further include corresponding computer programs.

A computer program comprises instructions which, when executed on at least one processor of network equipment 16A, cause the network equipment 16A to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of network equipment 16A, cause the network equipment 16A to perform as described above.

Embodiments further include a computer program product comprising program code portions for performing the steps of any of the embodiments herein when the computer program product is executed by a computing device. This computer program product may be stored on a computer readable recording medium.

Although some embodiments herein are described as being applied to NAS communication, other embodiments herein extend to any control plane communication between the wireless device 12 and network equipment 16A.

Additional embodiments will now be described. At least some of these embodiments may be described as applicable in certain contexts and/or wireless network types for illustrative purposes, but the embodiments are similarly applicable in other contexts and/or wireless network types not explicitly described.

3GPP is currently developing the standards for the 5$^{th}$ Generation (5G) of wireless communication systems, a.k.a. Next Generation (NG) Systems. It is expected that 5G will support many new scenarios and use cases and will be an enabler for the internet-of-things, IoT. It is expected that NG systems will provide connectivity to a wide range of new devices such as sensors, smart wearables, vehicles, machines, etc. Flexibility would be then a key property in NG Systems. This is reflected in the security requirement for network access that are mandating the support of alternative authentication methods and different types of credentials than the usual authentication and key agreement (AKA) credentials pre-provisioned by the operator and securely stored in the universal integrated circuit card (UICC). This would allow factory owners or enterprises to leverage their own identity and credential management systems for authentication and access network security.

Figure 5:
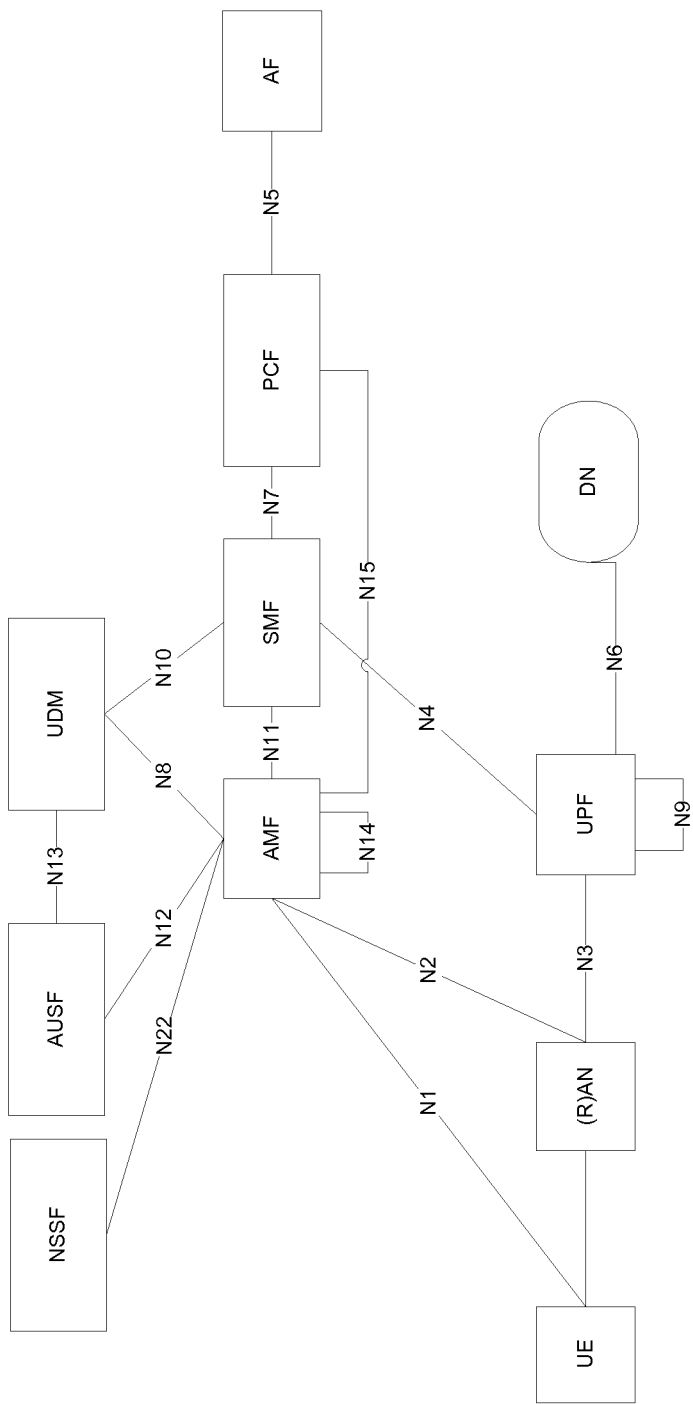
FIG. 5 is a block diagram of a 5G system (5GS) according to some embodiments.

The 3$^{RD}$ generation partnership project (3GPP) architecture working group has finalized the architecture of 5G Systems illustrated in FIG. 5, which is from TS 23.501. This is the non-roaming 5G system architecture in reference point representation.

In order to guarantee a smooth deployment of the 5G Systems, the 3GPP architecture group is currently working on the support of interworking between 4G (legacy) and 5G Systems. This will allow not only idle mobility between the systems but also handovers.

Figure 6:
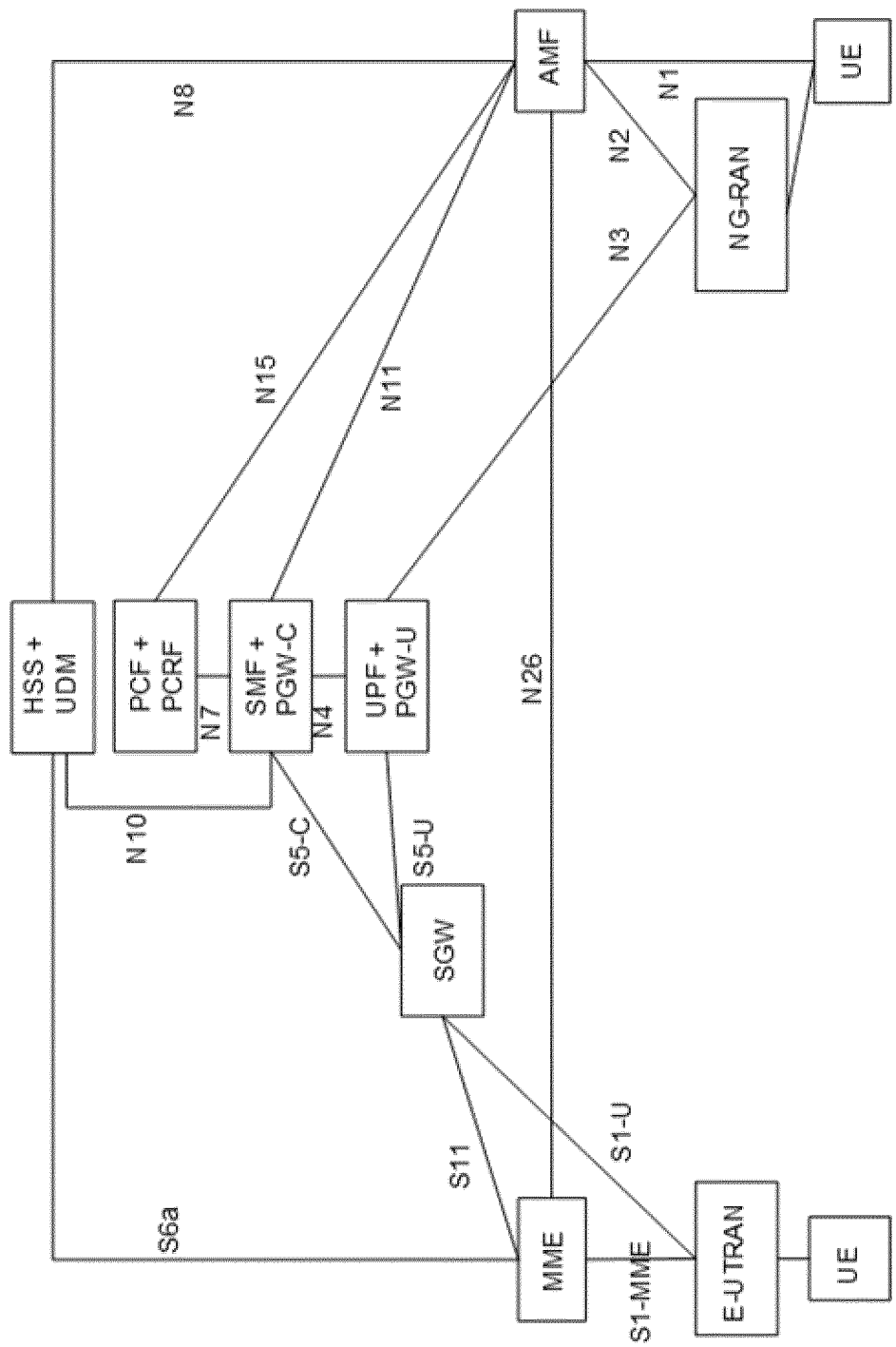
FIG. 6 is a block diagram of a non-roaming architecture for interworking between the 5G system (5GS) and the evolved packet core (EPC)/Evolved Universal Mobile Telecommunications System (UMTS) Terrestrial Radio Access (E-UTRAN) according to some embodiments.

Interworking involves network entities and data objects belonging to different generation systems. The final non-roaming architecture for interworking between the 5G system (5GS) and the evolved packet core (EPC)/Evolved Universal Mobile Telecommunications System (UMTS) Terrestrial Radio Access (E-UTRAN) is given in FIG. 6 from TS 23.501. The general principle has been to adapt to the older generation in order to minimize the impact on legacy infrastructure and ensure a smooth deployment of the new one. Accordingly, the security mechanisms for interworking should minimize or avoid the impact on 4G systems.

Consequently, the newer generation must adapt to the older generation. Nevertheless, this should not incur restrictions or constraints on the 5G security mechanisms outside of interworking. More precisely, interworking with 4G should not prevent the independent evolution of 5G security, e.g. introducing new crypto algorithms, increasing the size of the medium access control (MAC) fields, etc. In other terms, the security mechanisms for interworking should not prevent the independent evolution of 5G security.

There currently exist certain challenge(s). The security mechanisms for interworking should provide the means to protect the transfer of the user equipment (UE) context from the source to the target systems. How this transfer is triggered depends on whether the UE is idle or active. In idle mode mobility, the transfer is triggered by a Non-Access Stratum (NAS) message from the UE to the serving Core Network (CN) entity in the target system. In active mode mobility (handovers), the transfer is triggered by an internal message (handover required) from the Radio Access Network (RAN) to the serving CN entity within the source system. So basically, the source system initiates the transfer.

The security mechanism must also provide the means to derive new and fresh keys for the target system. For this issue, one principle that has been observed during the development of the 5G is that of backward security. Backward security as defined in TS 33.501 is the property that for an entity with knowledge of a key $K_n$, it is computationally infeasible to compute any previous $K_{n-m}$ (m>0) from which $K_n$ is derived.

To realize backward security in 5GS during an access and mobility function (AMF) change, the source AMF may derive a new $K_{AMF}$ key for the target AMF using the current key and one of the NAS COUNTs. More precisely, during idle mode mobility, the NAS uplink COUNT is used and for handovers involving AMF change, the NAS downlink COUNT is used. In order to mitigate key reuse in an event of a handover failure, the NAS downlink COUNT is always increased by the source AMF before the transfer of the UE context to the target AMF. In an event of handover failure where the UE ends back in the source AMF, this mechanism guarantees that the NAS downlink COUNT value at hand is fresh and could be safely used to derive another $K_{AMF}$.

In the evolved packet system (EPS), the situation is different since as described in TS 33.401, the source mobility management (MME) always transfers the NAS COUNTs without any change. The source MME however always generates a new next hop (NH) and increments the associated next hop chaining (NCC) counter before the transfer during a handover involving an MME change. Therefore, during interworking with 5GS, there is a risk that the received NAS downlink COUNT is unchanged during a handover failure followed by a new handover procedure from EPS to 5GS. This is why for interworking from legacy EPS to 5GS, the NH parameter may be used to derive the $K_{AMF}$ key from the $K_{ASME}$ instead of the NAS downlink COUNT as described in TS 33.501. Since the NH parameter is always fresh, it prevents key reuse.

In 5GS, incrementing the NAS downlink COUNT before context transfer between AMFs during handovers will facilitate the introduction of a clean and simple solution for interworking with future systems. In such future scenario, it is expected that a source AMF will behave as if it is interacting with a target AMF, though it could be a totally different function. Nevertheless, this target function will have the means to always derive a new fresh key from the received $K_{AMF}$ key.

One problem is related to how to handle NAS counter wraparounds. It is required that the AMF shall activate fresh NAS keys from a primary authentication run or activate native security context, which has a sufficiently low NAS COUNT values, before the NAS uplink or downlink COUNT wraps around with the current security context. Problematically, then, the only means heretofore by which an AMF can remedy this is to run a primary authentication, thus establishing a new $K_{AMF}$.

Certain aspects of the present disclosure and their embodiments may provide solutions to these or other challenges. Some embodiments propose that a source AMF may trigger a $K_{AMF}$ horizontal key derivation in order to refresh the keys whenever needed as for example when the NAS counters are about to wrap around.

Certain embodiments may provide one or more of the following technical advantage(s). Some embodiments have one or more of the following advantages: (1) avoid the need of a primary authentication run, so as to avoid the signaling overhead that would have been incurred; (2) allow refreshing the $K_{AMF}$ key and all subsequently derived NAS and AS keys.

Figure 7:
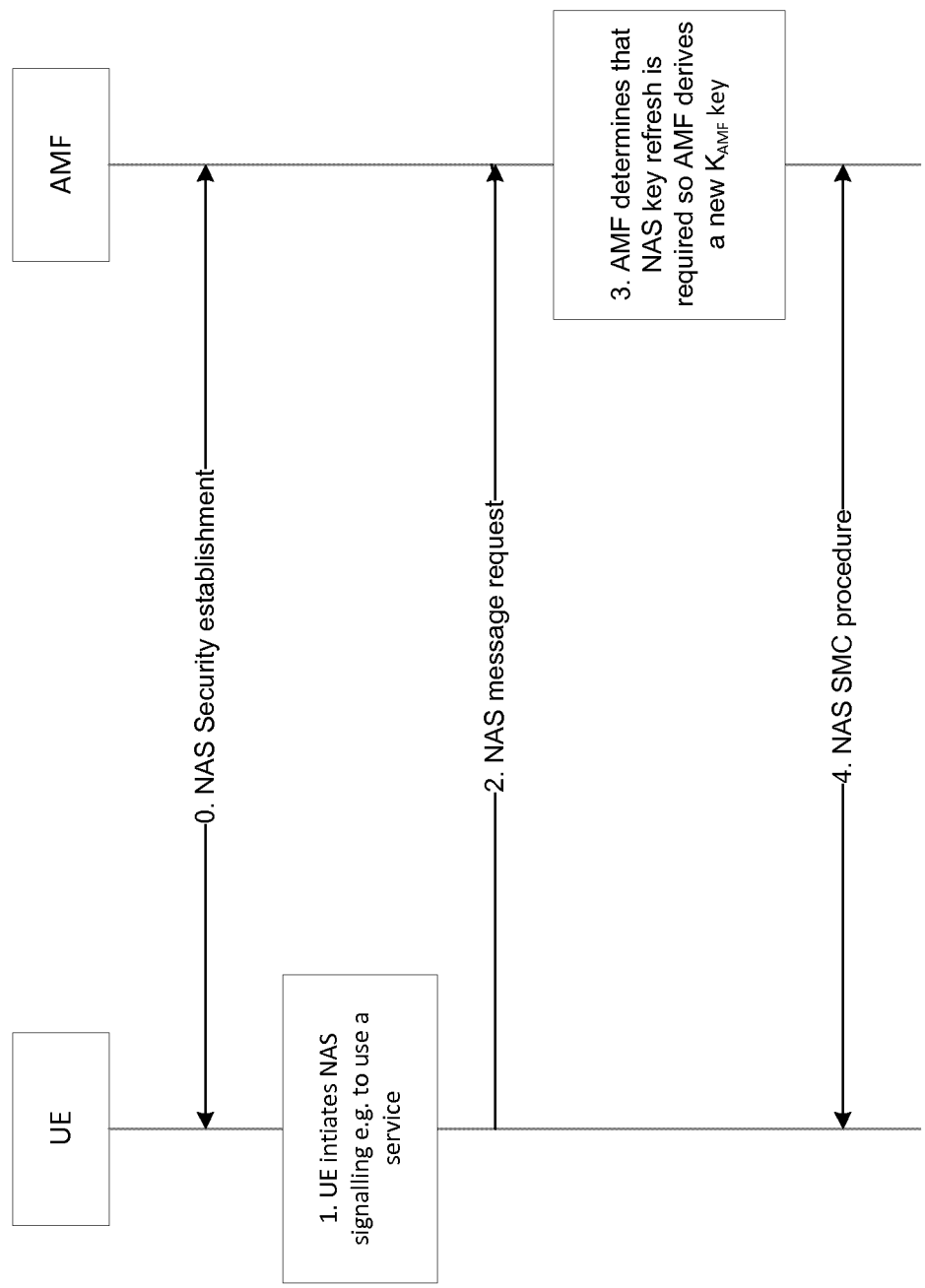
FIG. 7 is a call flow diagram of horizontal key derivation for NAS key refresh according to some embodiments.

Some embodiments propose to use the horizontal key derivation feature introduced for the $K_{AMF}$ key to refresh the NAS keys or reset the NAS counters when they are about to wrap around. In order to activate such a new key, a run of a NAS Security Mode Procedure may be required so that the UE and the AMF synchronize and start using the security context based on the newly derived key. FIG. 7 illustrates some embodiments in this regard concerning horizontal $K_{AMF}$ key derivation for NAS key refresh.

In step 0, it is assumed that the UE is registered and that the UE and the AMF have already established and activated a NAS security context.

At one point, in step 1, the UE determines that it must initiate some NAS signaling for example in order to access a service (Service Request) or follow a handover involving an AMF change to register to the new target AMF (Registration Request).

In step 2, the UE sends a first NAS message to re-establish the NAS connection with the network.

At one point, in step 3, the AMF determines that NAS key refresh is required for example due to the NAS counters being about to wrap around or based on a local operator policy to refresh the NAS keys after a certain time or "amount" of usage. The AMF derives a new $K_{AMF}$ key using horizontal $K_{AMF}$ derivation as described for the idle mode mobility case in TS 33.501, i.e. using the current NAS uplink COUNT value. The difference here is that this newly derived $K_{AMF}$ key is to be used by the same AMF while in the mobility case, it is handed over to the target AMF.

In step 4, in order to activate the newly derived $K_{AMF}$ key, the AMF triggers a NAS SMC run including the current NAS uplink COUNT value as described for the idle mode mobility case in TS 33.501. The UE derives a new $K_{AMF}$ key in the same way as the AMF using the NAS uplink COUNT value included in the NAS SMC.

As a result of a successful completion of step 4, the UE and the AMF will share a new NAS security context with fresh keys and reinitialized NAS COUNTs.

In case of multiple NAS connections established over 3GPP access and non-3GPP access in the same AMF, the AMF may either: (1) take the newly derived $K_{AMF}$ into use over a second NAS connection by running a NAS SMC run over the second NAS connection by including the ngKSI of the newly derived $K_{AMF}$ key or (2) the AMF and UE may take the newly derived $K_{AMF}$ into use over all NAS connections immediately at the same time.

In some embodiments, NAS COUNT is the 24-bit NAS UL COUNT or the 24-bit NAS DL COUNT value, depending on the direction, that is associated to the current NAS connection identified by the value used to form the BEARER input. A NAS COUNT may be constructed as: NAS COUNT:=NAS OVERFLOW||NAS SQN. Here, NAS OVERFLOW is a 16-bit value which is incremented each time the NAS SQN is incremented from the maximum value. And NAS SQN is the 8-bit sequence number carried within each NAS message.

A wireless communication system herein may comprise and/or interface with any type of communication, telecommunication, data, cellular, and/or radio network or other similar type of system. In some embodiments, the wireless communication system may be configured to operate according to specific standards or other types of predefined rules or procedures. Thus, particular embodiments of the wireless communication system may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The wireless communication system may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

As used herein, network equipment 16A refers to equipment capable, configured, arranged and/or operable to communicate directly or indirectly with a wireless device and/or with other network nodes or equipment in the wireless communication system to enable and/or provide wireless access to the wireless device and/or to perform other functions (e.g., administration) in the wireless communication system. Examples of network equipment include, but are not limited to, equipment in a core network of the wireless communication system for implementing a mobility management entity (MME) or an access and mobility function (AMF). More generally, however, network equipment may represent any suitable device (or group of devices) capable, configured, arranged, and/or operable to enable and/or provide a wireless device with access to the wireless communication system or to provide some service to a wireless device that has accessed the wireless communication system.

As used herein, wireless device (WD) refers to a device capable, configured, arranged and/or operable to communicate wirelessly with network equipment and/or other wireless devices. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a user equipment (UE), a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by network equipment configured for use in a wireless communication network, wherein the network equipment implements an access and mobility function (AMF), the method comprising:
    detecting one or more conditions under which non-access stratum (NAS) keys that protect NAS communication between the network equipment and a wireless device are to be refreshed, wherein the one or more conditions include one or more conditions that are detected before a value of a NAS COUNT for a NAS connection between the network equipment and the wireless device wraps around from a maximum value to an initial value, wherein the one or more conditions include a condition that the value of the NAS COUNT is within a certain threshold from the maximum value, wherein the NAS COUNT counts a number of NAS messages sent in a certain direction over the NAS connection;
    responsive to detecting the one or more conditions, deriving, from a base key on which the NAS keys were derived and from the value of the NAS COUNT, a new base key on which fresh NAS keys are to be derived, wherein the new base key is derived using horizontal key derivation without running an authentication and key agreement (AKA)-based primary authentication procedure and without activating a native security context for the wireless device, wherein the base key is a $K_{AMF}$ key, and wherein the new base key is a new $K_{AMF}$ key;
    activating the new base key;
    deriving fresh NAS keys from the new base key; and
    transmitting or receiving NAS communication that is protected with the fresh NAS keys.

2. The method of claim 1, wherein said deriving comprises computing the new base key as an output of a key derivation function that takes a string and a key as inputs, wherein the base key is input to the key derivation function as said key, wherein a set of parameters concatenated together is input to the key derivation function as said string, wherein the set of parameters includes the value of the NAS COUNT.

3. The method of claim 2, wherein the key derivation function is a hash-based message authentication code (HMAC) function that uses a Secure Hash Algorithm (SHA) to hash inputs to the HMAC function in the form of a string and a key.

4. The method of claim 1, wherein said activating comprises performing a NAS security mode command (SMC) procedure between the network equipment and the wireless device to establish between the network equipment and the wireless device a new NAS security context that includes the new base key.

5. The method of claim 4, wherein performing the NAS SMC procedure comprises transmitting a NAS SMC message to the wireless device indicating the value of the NAS COUNT.

6. The method of claim 1, wherein deriving the new base key comprises deriving the new base key without running a primary authentication procedure and without activating a native security context.

7. Network equipment configured for use in a wireless communication network, wherein the network equipment implements an access and mobility function (AMF), the network equipment comprising:
communication circuitry;
and processing circuitry configured to:
detect one or more conditions under which non-access stratum (NAS) keys that protect NAS communication between the network equipment and a wireless device are to be refreshed,
wherein the one or more conditions include one or more conditions that are detected before a value of a NAS COUNT for a NAS connection between the network equipment and the wireless device wraps around from a maximum value to an initial value,
wherein the one or more conditions include a condition that the value of the NAS COUNT is within a certain threshold from the maximum value,
wherein the NAS COUNT counts a number of NAS messages sent in a certain direction over the NAS connection;
responsive to detecting the one or more conditions,
derive, from a base key on which the NAS keys were derived and from the value of the NAS COUNT, a new base key on which fresh NAS keys are to be derived,
wherein the new base key is derived using horizontal key derivation without running an authentication and key agreement (AKA)-based primary authentication procedure and without activating a native security context for the wireless device,
wherein the base key is a $K_{AMF}$ key, and wherein the new base key is a new KAMF key;
activate the new base key;
derive fresh NAS keys from the new base key; and
transmit or receive NAS communication that is protected with the fresh NAS keys.

8. The network equipment of claim 7, wherein the processing circuitry is configured to derive the new base key by computing the new base key as an output of a key derivation function that takes a string and a key as inputs, wherein the base key is input to the key derivation function as said key, wherein a set of parameters concatenated together is input to the key derivation function as said string, wherein the set of parameters includes the value of the NAS COUNT.

9. The network equipment of claim 8, wherein the key derivation function is a hash-based message authentication code (HMAC) function that uses a Secure Hash Algorithm (SHA) to hash inputs to the HMAC function in the form of a string and a key.

10. The network equipment of claim 7, wherein the processing circuitry is configured to activate the new base key by performing a NAS security mode command (SMC) procedure between the network equipment and the wireless device to establish between the network equipment and the wireless device a new NAS security context that includes the new base key.

11. The network equipment of claim 10, wherein the processing circuitry is configured to transmit a NAS SMC message to the wireless device indicating the value of the NAS COUNT.

12. The network equipment of claim 7, wherein the processing circuitry is configured to derive the new base key by deriving the new base key without running a primary authentication procedure and without activating a native security context.

13. A non-transitory computer readable medium on which is stored instructions that, when executed by at least one processor of network equipment, causes the network equipment to:
detect one or more conditions under which non-access stratum (NAS) keys that protect NAS communication between the network equipment and a wireless device are to be refreshed,
wherein the one or more conditions include one or more conditions that are detected before a value of a NAS COUNT for a NAS connection between the network equipment and the wireless device wraps around from a maximum value to an initial value,
wherein the one or more conditions include a condition that the value of the NAS COUNT is within a certain threshold from the maximum value,
wherein the NAS COUNT counts a number of NAS messages sent in a certain direction over the NAS connection;
responsive to detecting the one or more conditions,
derive, from a base key on which the NAS keys were derived and from the value of the NAS COUNT, a new base key on which fresh NAS keys are to be derived,
wherein the new base key is derived using horizontal key derivation without running an authentication and key agreement (AKA)-based primary authentication procedure and without activating a native security context for the wireless device,
wherein the base key is a $K_{AMF}$ key, and wherein the new base key is a new KAMF key;
activate the new base key;
derive fresh NAS keys from the new base key; and
transmit or receive NAS communication that is protected with the fresh NAS keys.

* * * * *

UNITED STATES PATENT AND TRADEMARK OFFICE
CERTIFICATE OF CORRECTION

| | |
|---|---|
| PATENT NO. | : 11,974,122 B2 |
| APPLICATION NO. | : 17/267825 |
| DATED | : April 30, 2024 |
| INVENTOR(S) | : Ben Henda et al. |

It is certified that error appears in the above-identified patent and that said Letters Patent is hereby corrected as shown below:

On the Title Page

On Page 2, Item (56), under "OTHER PUBLICATIONS", in Column 2, Line 21, delete "Ericsson ," and insert -- Ericsson, --, therefor.

On Page 2, Item (56), under "OTHER PUBLICATIONS", in Column 2, Line 24, delete "Ericsson ," and insert -- Ericsson, --, therefor.

On Page 2, Item (56), under "OTHER PUBLICATIONS", in Column 2, Line 28, delete "Ericsson ," and insert -- Ericsson, --, therefor.

In the Drawings

In Fig. 4B, Sheet 4 of 7, for Tag "420", Line 1, delete "DERIVNIG" and insert -- DERIVING --, therefor.

In Fig. 7, Sheet 7 of 7, for Tag "1", Line 1, delete "intiates" and insert -- initiates --, therefor.

In the Specification

In Column 3, Line 59, delete "Access" and insert -- Access Network --, therefor.

In Column 4, Line 38, delete "$K_{NAsint}$" and insert -- $K_{NASint}$ --, therefor.

In Column 4, Line 39, delete "$K_{NAsenc}$" and insert -- $K_{NASenc}$ --, therefor.

In Column 5, Line 21, delete "(H MAC)" and insert -- (HMAC) --, therefor.

In Column 9, Line 52, delete "Access" and insert -- Access Network --, therefor.

Signed and Sealed this
Seventeenth Day of September, 2024

*Katherine Kelly Vidal*
*Director of the United States Patent and Trademark Office*

CERTIFICATE OF CORRECTION (continued)
U.S. Pat. No. 11,974,122 B2

In Column 10, Line 37, delete "management" and insert -- management entity --, therefor.

In Column 10, Line 40, delete "chaining (NCC) counter" and insert -- chaining counter (NCC) --, therefor.

In Column 12, Line 20, delete "(WiMax)," and insert -- (WiMAX), --, therefor.

In Column 13, Line 1, delete "(CPE)." and insert -- (CPE), --, therefor.

In Column 13, Line 17, delete "narrow band internet of things" and insert -- Narrowband Internet of Things --, therefor.

In Column 13, Line 50, delete "according" and insert -- according to --, therefor.

In the Claims

In Column 15, Line 44, in Claim 7, delete "KAMF" and insert -- $K_{AMF}$ --, therefor.

In Column 16, Line 51, in Claim 13, delete "KAMF" and insert -- $K_{AMF}$ --, therefor.